Jan. 14, 1958  
J. CAYZAC  
2,820,198  
DEVICE FOR FREQUENCY MODULATION OF HIGH  
FREQUENCY OSCILLATIONS  
Filed Nov. 9, 1954
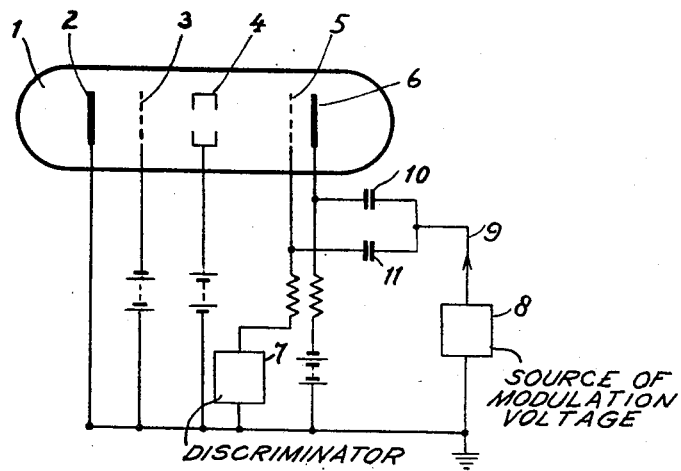
INVENTOR  
JACQUES CAYZAC  
BY  
AGENT

United States Patent Office 2,820,198
Patented Jan. 14, 1958

2,820,198

DEVICE FOR FREQUENCY MODULATION OF HIGH FREQUENCY OSCILLATIONS

Jacques Cayzac, St. Hilaire, France, assignor, by mesne assignments, to North American Philips Company, Inc., New York, N. Y., a corporation of Delaware Application November 9, 1954, Serial No. 467,850

Claims priority, application France December 18, 1953

2 Claims. (Cl. 332—7)

The invention relates to devices for frequency modulation of high frequency oscillations, which devices comprise a velocity modulation tube, more particularly a velocity modulation tube of the reflex kind.

In order to achieve a frequency modulation of the oscillations produced in the tube it is known in such a device to supply a modulation voltage to a suitable tube electrode.

In various uses, more particularly in the transmission of signals having a wide frequency band, for example television signals, difficulties arise relative to non-linearities of the modulation characteristic (that is to say the curve representing the frequency variation as a function of the modulation voltage).

It is an object of the invention to provide improved devices of the kind described in the opening part such that the said difficulty is substantially obviated, whilst as an additional advantage an increase in the steepness of the slope of the modulation characteristic is obtained.

According to the invention in such a device comprising a velocity modulation tube the modulation voltage is supplied simultaneously to more than one electrode of the tube.

A particularly advantageous modulation characteristic is obtained in a device of the said kind comprising a velocity modulation tube of the reflex type provided with two successive reflector electrodes to which the modulation voltage is supplied in parallel.

The invention and the obtained advantages will now be described with reference to the single figure of the drawing.

The figure shows a frequency modulation device comprising a velocity modulation tube 1 of the reflex kind. The tube comprises in succession a cathode 2, a focussing electrode 3, an anode 4 designed as a resonant cavity (re-entrant type cavity resonator) and two successive reflector electrodes 5 and 6 respectively.

The reflector electrode 6 has a negative bias voltage applied to it. To the reflector electrode 5 a control voltage is supplied which is derived from a discriminator circuit-arrangement 7 acting as an automatic frequency control. The automatic frequency control discriminator circuit 7 may be a conventional type such as is shown, for example, in Figs. 16–12 on page 797 of Radio Engineering, by Terman (McGraw-Hill Book Co., 3rd ed., 1947), and it produces a variable corrective voltage to stabilize the oscillator frequency. According to the invention the modulation voltage derived from a modulator 8 is supplied in parallel, via a lead 9 through capacitors 10 and 11, to the reflector electrodes 5, 6.

In order that the importance of the invention be clearly shown it should be mentioned that in experimental use of the described circuit-arrangement a modulation voltage having an exactly determined amplitude was supplied in succession to the reflector electrode 6, to the reflector electrode 5 and finally to the two reflector electrodes 5, 6 simultaneously. It was found that in the last-mentioned case the frequency modulation characteristic exhibited a considerably higher linearity whilst, in addition, a total frequency variation was obtained exceeding the sum of the frequency variations in the first two cases. On the other hand the inevitably occurring amplitude modulation proved to be only slightly greater than if the modulation voltage was supplied to only one of the reflectors.

It should be mentioned here that when, in a device according to the invention, the tube was replaced by a tube of the same kind the relative differences in steepness of the slopes of the modulation characteristics of the tubes generally proved to be less than when the modulation voltage was supplied to only a single tube electrode.

A variety of alternative embodiments which fall within the scope of the invention are possible. Thus, instead of supplying the entire modulation voltage to the various tube electrodes a predetermined fraction of the modulation voltages of different value may be supplied to the electrodes by means of a voltage divider in order to obtain a frequency modulation characteristic the course of which is as linear as possible.

What is claimed is:

1. An arrangement for frequency-modulating high frequency oscillations, comprising a velocity modulation tube of the reflex kind having two successively arranged reflector electrodes, a source of modulation voltage, and means connected to apply said modulation voltage simultaneously in parallel to said reflector electrodes.

2. An arrangement as claimed in claim 1, including means connected to cause different predetermined values of said modulation voltage to be applied to said two reflector electrodes.

References Cited in the file of this patent

UNITED STATES PATENTS

| | | |
|---|---|---|
| 2,434,704 | Kroger | Jan. 20, 1948 |
| 2,452,075 | Smith | Oct. 26, 1948 |
| 2,468,928 | Hansen et al. | May 3, 1949 |
| 2,659,024 | Bernier et al. | Nov. 10, 1953 |